United States Patent
Chan et al.

(10) Patent No.: US 11,003,290 B2
(45) Date of Patent: May 11, 2021

(54) SENSING FILM WITH AN INTEGRATED STRUCTURE

(71) Applicant: New Asia Group Holdings Limited, Hong Kong (HK)

(72) Inventors: Chung Pui Chan, Hong Kong (HK); Wing Hong Choi, Hong Kong (HK); Lai Fan Lai, Hong Kong (HK); Chien Chung, Hong Kong (HK)

(73) Assignee: New Asia Group Holdings Limited, Hong Kong (HK)

(*) Notice: Subject to any disclaimer, the term of this patent is extended or adjusted under 35 U.S.C. 154(b) by 0 days.

(21) Appl. No.: 16/641,276

(22) PCT Filed: Oct. 11, 2018

(86) PCT No.: PCT/IB2018/057874
§ 371 (c)(1),
(2) Date: Feb. 24, 2020

(87) PCT Pub. No.: WO2019/073428
PCT Pub. Date: Apr. 18, 2019

(65) Prior Publication Data
US 2020/0233508 A1 Jul. 23, 2020

Related U.S. Application Data

(63) Continuation of application No. 16/147,575, filed on Sep. 29, 2018, now Pat. No. 10,572,089.
(Continued)

(51) Int. Cl.
*G06F 3/044* (2006.01)

(52) U.S. Cl.
CPC .... *G06F 3/044* (2013.01); *G06F 2203/04102* (2013.01); *G06F 2203/04103* (2013.01); *G06F 2203/04112* (2013.01)

(58) Field of Classification Search
None
See application file for complete search history.

(56) References Cited

U.S. PATENT DOCUMENTS

| 8,492,189 B2 ‡ | 7/2013 | Sun | B01J 19/0046 438/57 |
| 9,244,356 B1 ‡ | 1/2016 | Kobrin | H05K 1/0287 |

(Continued)

FOREIGN PATENT DOCUMENTS

| CN | 103864062 B | ‡ | 7/2015 |
| CN | 104992752 A | ‡ | 10/2015 |

(Continued)

OTHER PUBLICATIONS

Zhaoyang Liu et. al., "Transparent Conductive Electrodes from Graphene/PEDOT:PSS Hybrid Inks for Ultrathin Organic Photodetectors", Advanced Materials, 2014, 10, p. 1-7.‡

(Continued)

*Primary Examiner* — Ashok Patel
(74) *Attorney, Agent, or Firm* — Idea Intellectual Limited; Margaret A. Burke; Sam T. Yip

(57) ABSTRACT

A flexible transparent sensing film with embedded electrodes is described in the present invention, which would greatly improve the optical transmittance, electrical conductivity and reliability. The present sensing film can also simultaneously enable multiple touches for distinct locations sensing and at least another set of electrical signal sensing. The present sensing film includes a top conductive electrode, a bottom conductive electrode (140) and a dielectric substrate or a functional substrate that would generate electrical signal response due to a specific input such as motion, light, chemical, or temperature. The present sensing film apparatus could be configured to have the top and bottom conductive electrodes which are partially or fully (Continued)

embedded onto the surfaces of the dielectric and/or functional substrates.

20 Claims, 4 Drawing Sheets

Related U.S. Application Data

(60) Provisional application No. 62/571,220, filed on Oct. 11, 2017.

(56) References Cited

U.S. PATENT DOCUMENTS

| | | | | |
|---|---|---|---|---|
| 2008/0074398 | A1* | 3/2008 | Wright | G06F 3/0443 345/173 |
| 2011/0260741 | A1‡ | 10/2011 | Weaver | G06F 3/0445 324/68 |
| 2012/0291837 | A1‡ | 11/2012 | Lin | C09F 7/00 136/244 |
| 2013/0047428 | A1‡ | 2/2013 | Ra | G06F 3/041 29/846 |
| 2013/0207911 | A1‡ | 8/2013 | Barton | G06F 3/0488 345/173 |
| 2014/0213013 | A1‡ | 7/2014 | Britt | H01L 31/0508 438/80 |
| 2014/0224322 | A1‡ | 8/2014 | Takeda | H01L 51/445 136/256 |
| 2014/0291008 | A1‡ | 10/2014 | Huang | H05K 1/0296 174/268 |
| 2014/0293161 | A1‡ | 10/2014 | Tang | G06F 3/041 349/12 |
| 2015/0216057 | A1‡ | 7/2015 | Park | H05K 3/207 174/25 |
| 2016/0225483 | A1‡ | 8/2016 | Wu | C08K 3/08 |
| 2016/0345430 | A1‡ | 11/2016 | Khan | C25D 5/54 |
| 2017/0345965 | A1‡ | 11/2017 | Seo | B32B 7/02 |

FOREIGN PATENT DOCUMENTS

| | | | | |
|---|---|---|---|---|
| JP | 2010034538 A | ‡ | 2/2010 | |
| KR | 1020140012501 A | | 2/2014 | |
| KR | 1020150003085 A | | 1/2015 | |
| WO | WO-2011046775 A1 | ‡ | 4/2011 | ........... C01B 32/186 |

OTHER PUBLICATIONS

Yu Ze Chen et. al., "Low Temperature Growth of Graphene on Glass by Carbon-Enclosed Chemical Vapor Deposition Process and Its Application as Transparent Elecrtrode", Chemistry of Materials, 2015, 27, 1636-1655, p. 1-30.‡

Hui Wu et. al., "A Transparent Electrode based on a Metal Nanotrough Network", Nature Nanotechnology, 2013, 8, p. 1-5.‡

European Search Report of EP2018166428 dated Sep. 10, 2018.‡

Darren J. Lipomi et. al., "Electronic Properties of Transparent Conductive Films of PEDOT:PSS on Stretchable Substrates", Chemistry of Materials, 2012, 24, p. 373-382.‡

Zongping Chen et. al., "Three-Dimensional Flexible and Conductive Interconnected Graphene Networks Grown by Chemical Vapour Deposition", Nature Materials, 10, Apr. 10, 2011, p. 424-428.‡

Z.L. Pei et. al., "Transparent Conductive ZnO:Al Thin Films Deposited on Flexible Substrates Prepared by Direct Current Magnetron Sputtering", Thin solid Films, 2006, 497, p. 20-23.‡

Jun Han et. al., "Fully Indium-free Flexible Ag Nanowires/ZnO:F Composite Transparent Conductive Electrodes with High Haze", Journal of Materials Chemistry A, 2015, 3, p. 1-40.‡

Chao Chen et. al., "Fabrication of Silver Nanowire Transparent Conductive Films with an Ultra-Low Haze and Ultra-High Uniformity and Their Application in Transparent Electronics", Journal of Materials Chemistry C, 5, Jan. 31, 2017, p. 1-8.‡

Won-Kyung Kim et. al., "Cu Mesh for Flexible Transparent Conductive Electrodes", Scientific Reports, 5, Jun. 3, 2015, Article No. 10715, p. 1-8.‡

First office action of corresponding Korean Patent Application No. 1020207012810 dated Jul. 16, 2020.

\* cited by examiner
‡ imported from a related application

SENSING FILM WITH AN INTEGRATED STRUCTURE

CROSS-REFERENCE TO RELATED APPLICATIONS

This is a 371 application of International Patent Application No. PCT/IB2018/057874 filed Oct. 11, 2018, which claims priorities from U.S. provisional patent application No. 62/571,220 filed Oct. 11, 2017 and U.S. non-provisional patent application Ser. No. 16/147,575 filed Sep. 29, 2018 (issued on Feb. 25, 2020 under U.S. Pat. No. 10,572,089), and is also a continuation of non-provisional patent application Ser. No. 16/147,575; and the disclosures of which are incorporated herein by reference in their entirety.

TECHNICAL FIELD

The present invention relates to a sensing film for application in touch panel display and other electronic sensing devices having outstanding optical and electrical properties, and excellent flexibility with embedded conductive network of electrodes into the dielectric or functional substrate.

BACKGROUND

The following references are incorporated herein by reference in their entirety:
US2010/0156811 A1
US2013/0233468 A1
U.S. Pat. No. 8,492,189
US2016/0345430 A1
U.S. Pat. No. 9,244,356 B1
US20160209943 A1
CN 104992752 A
US 20160225483 A1
CN 103864062 B
WO 2011046775 A1
Won-Kyung Kim et. al., Cu Mesh for Flexible Transparent Conductive Electrodes, Scientific Reports 5, Jun. 3, 2015, Article number: 10715
Chao Chen et. al., Fabrication of silver nanowire transparent conductive films with an ultra-low haze and ultra-high uniformity and their application in transparent electronics, J. Mater. Chem. C, 5, 31, Jan. 2017, pp. 2240-2246
Zongping Chen et. al., Three-dimensional flexible and conductive interconnected graphene networks grown by chemical vapour deposition, Nature Materials 10, 10 Apr., 2011, pp. 424-428
Han, J.; Yuan, S.; Liu, L.; Qiu, X.; Gong, H.; Yang, X.; Li, C.; Hao, Y.; Cao, B. Fully indium-free flexible Ag nanowires/ZnO:F composite transparent conductive electrodes with high haze. J. Mater. Chem. A 2015, 3, pp. 5375-5384
Pei, Z. L.; Zhang, X. B.; Zhang, G. P.; Gong, J.; Sun, C.; Huang, R. F.; Wen, L. S. Transparent conductive ZnO:Al thin films deposited on flexible substrates prepared by direct current magnetron sputtering. Thin Solid Films 2005, 68, 20-23.
Chen, Y. Z.; Medina, H.; Tsai, H. W.; Wang, Y. C.; Yen, Y. T.; Manikandan, A.; Chueh, Y. L. Low Temperature Growth of Graphene on Glass by Carbon-Enclosed Chemical Vapor Deposition Process and Its Application as Transparent Electrode. Chem. Mater. 2015, 27, 1636-1655
Liu, Z.; Parvez, K.; Li, R.; Dong, R.; Feng, X.; Mullen, K. Transparent Conductive Electrodes from Graphene/PE-DOT:PSS Hybrid Inks for Ultrathin Organic Photodetectors. Adv. Mater. 2015, 27, 669-675.
Lipomi, D. J.; Lee, J. A.; Vosgueritchian, M.; Tee, C. K.; Bolander, J. A.; Bao, Z. Electronic Properties of Transparent Conductive Films of PEDOT:PSS on Stretchable Substrates. Chem. Mater. 2012, 24, 373-382
Wu, H.; Kong, D.; Ruan, Z.; Hsu, P. C.; Wang, S.; Yu, Z.; Carney, T. J.; Hu, L.; Fan, S.; Cui, Y. A transparent electrode based on a metal nanotrough network. Nat. Nanotechnol. 2013, 8, 421-425
Sean M. Garner et al., *Flexible Glass: Enabling Thin, Lightweight, and Flexible Electronics*, 2017

As the advancement of mobile device technology, there are larger demands for touch display screen which are embedded as a replacement of physical keyboard for inputting data. Devices are appealing to large display panel with touch display screen such as mobile phones, portable video game devices and entertainment tablets. There are challenges to develop thinner and sensitive screen to meet the devices development.

In display industry, capacitive touch sensing is one of the most widely adopted technology, due to its high light transmittance and a broad range of temperature tolerance advantages. Typically, a capacitive touch sensing film consists of two transparent conductive electrodes such as ITO coated polyethylene terephthalate (PET) or glass. The two layers of transparent conductive electrodes are sandwiched with a dielectric layer then bonded by using an optical clear adhesive (OCA). The bottom PET layer is usually placed on top of an insulating layer made of glass or a PMMA for insulation while a protective layer of hard coating is placed on top of the upper PET layer for protection.

When a finger or an object presses onto the sensing film, a differential change in capacitance is generated. However, the aforesaid mentioned structures are complicated, which would not only induce optical reflection loss at the interfaces when there are mismatches on the refractive index but also raise reliability concerns and increase material costs.

For large touch screen applications, ITO conductors suffer from a drawback of relatively high electrical resistance which hamper their performance in terms of response time, better alternatives are sought to replace ITO and to modify the design of capacitive sensing film.

It is against this background to exclude the OCA in order to achieve a thinner display screen.

SUMMARY OF INVENTION

An object of the invention is to provide novel and advantageous transparent conductive electrode structures for forming the sensing film devices that can be used for touch panel display as well as other potential sensing systems and methods of fabricating the same, which can potentially reduce the overall thickness and greatly simplify the structure of the sensing film.

In this regard, it is provided that a sensing film (capacitive or electrical) comprising a transparent dielectric or functional substrate having a first surface and a second surface opposite to the first surface, where a first conductive network formed by a plurality of discrete electrically conductive electrodes is partially or fully embedded into the first surface of the dielectric or functional substrate while a second conductive network formed by a plurality of discrete electrically conductive electrodes is partially or fully embedded into the second surface of the dielectric or functional substrate;

In some cases, more than one conductive networks are partially or fully embedded into both surface of the dielectric or functional substrate to improve the sensitivity, stability and performance of sensing film. The transparent dielectric substrate can be any kinds of deformable materials such as flexible plastic films, etc. The functional substrate may be any kinds of transparent or non-transparent flexible film that can generate electrical signal under external triggering. Examples include piezoelectric, thermoelectric, lighting sensing, and photovoltaic films, etc. The design of the sensing film in the present invention can provide not only outstanding optical and electrical properties but also an excellent flexibility and reliability because the embedded network is firmly integrated into the substrate. Moreover, this design would eliminate or reduce the use of adhesives for the layer bonding, thus significantly reducing the overall thickness and improving the optical transmittance. One of the advantages of this invention is that the thickness of the sensing film would not increase no matter a single- or double-sided conductive network would be used. In addition, the design of this invention allows conductive network at a high aspect ratio embedded into the film, which increases electrical conductivity without reducing the optical transparency. Metallic wires/mesh are currently better alternatives to replace ITO conductors and suitable for simplifying the structure of the sensing film according to the present invention.

Compared to the sensing film using traditional transparent conductive oxide materials, like indium tin oxide (ITO), the design in this invention demonstrates a superior performance in terms of flexibility, optical, electrical and mechanical properties. Moreover, this invention does not require expensive vacuum equipment and can be processed under a relatively low temperature, thus the overall cost is lower.

In one aspect of the present invention, the second conductive network formed by a plurality of discrete electrically conductive electrodes being partially or fully embedded into the first surface of the dielectric or functional substrate such that the conductive electrodes of the first conductive network can be alternatively displaced from the conductive electrodes of the second conductive network.

BRIEF DESCRIPTION OF THE DRAWINGS

Embodiments of the present invention are described in more detail hereinafter with reference to the drawings, in which.

DETAILED DESCRIPTION OF INVENTION

Figure 1:
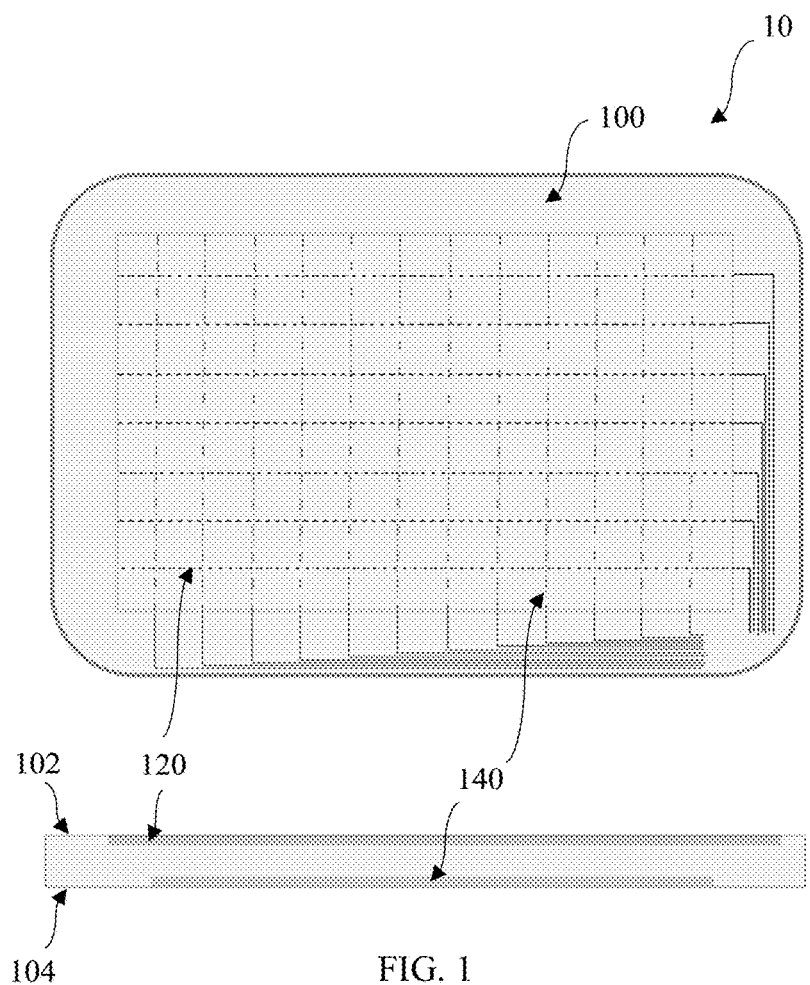
FIG. 1 shows the top view and the side view of a capacitive or electrical sensing film according to an embodiment of the present invention.

In the following description, the present thin capacitive or electrical sensing film under different parameters are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

According to one embodiment of present invention, a capacitive or electrical sensing film 10 includes a transparent dielectric or functional substrate 100 having a first surface 102 and a second surface 104 opposite to the first surface 102. A first conductive network 120 formed by a plurality of discrete electrically conductive electrodes is embedded on the first surface 102 of the dielectric or functional substrate, while a second conductive network 140 formed by a plurality of discrete electrically conductive electrodes is embedded on the second surface of the dielectric or functional substrate. The first conductive network 120 and the second conductive network 140 align at the edge of the dielectric or functional substrate 100 being exposed forming the contact to external. This kind of simple structure of fewer stack-up layers within capacitive or electrical sensing film reduces the optical reflection loss at interfaces which appearance of fringes occurs as a result of mismatched refractive indices.

FIG. 1 illustrates the fundamental structure of such embodiment that two conductive networks of a plurality of discrete electrically conductive electrodes embedded into both sides of the dielectric or functional substrate. For illustrative purposes, the electrodes of the first conductive network 120 are elongated and arranged in horizontal direction, whereas the electrodes of the second conductive network 140 are elongated and arranged in vertical direction, forming a grid of squares when it is viewed from top as shown, but it should be appreciated that other kinds arrangement may be made, e.g. grid of trapezium or rectangular units. In this configuration, the capacitive or electrical sensing film has higher accuracy with utilization of more than one sensing layer to determine the coordination of a touch. The dielectric or functional substrate can be made of PET, COC, COP, PMMA, PC, PI and PVDF, etc., of which the dielectric substrate is preferable to have a dielectric constant ranging from 1.1 to 10 while the functional substrate is capable of producing electrical signal under external triggering including change in light, force, pressure, temperature, electricity, and magnetic field.

Figures 2A, 2B:
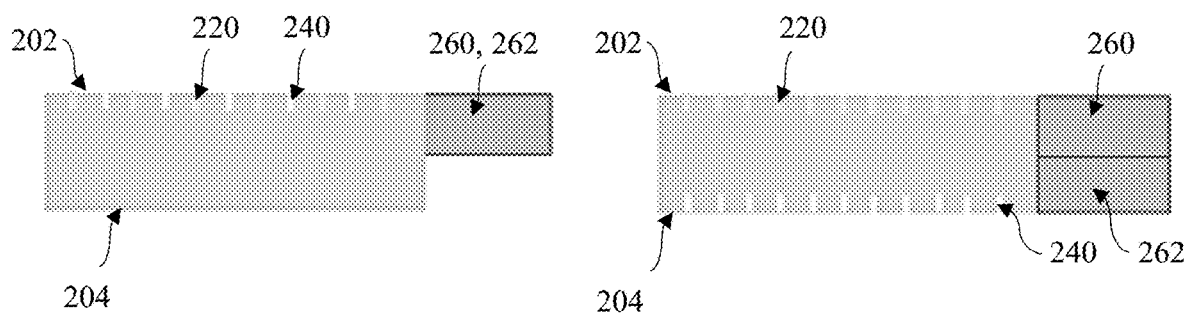
FIGS. 2A and 2B respectively show different arrangements of the conductive network on the substrate.

In another embodiment of present invention as depicted in FIG. 2A, the first conductive network 220 and the second conductive network 240 are both embedded into the first surface 202 of the transparent dielectric or functional substrate 200 such that the discrete elongated electrically conductive electrodes of the two conductive networks being disposed in a spaced and parallel relationship along the surface. In such configuration, metal trace 260 of the first conductive network 220 overlaps with the metal trace 262 of the second conductive network 240 from a side view which reduce the edge thickness. In contrast, optionally, the first conductive network 220 can be disposed on the first surface 202 and the second conductive network 240 can be disposed on a different surface, e.g., the second surface 204, as in FIG. 2B. The metal traces 260 and 262 of each of the conductive networks tend to overlap each other having a thicker edge.

Figure 3:
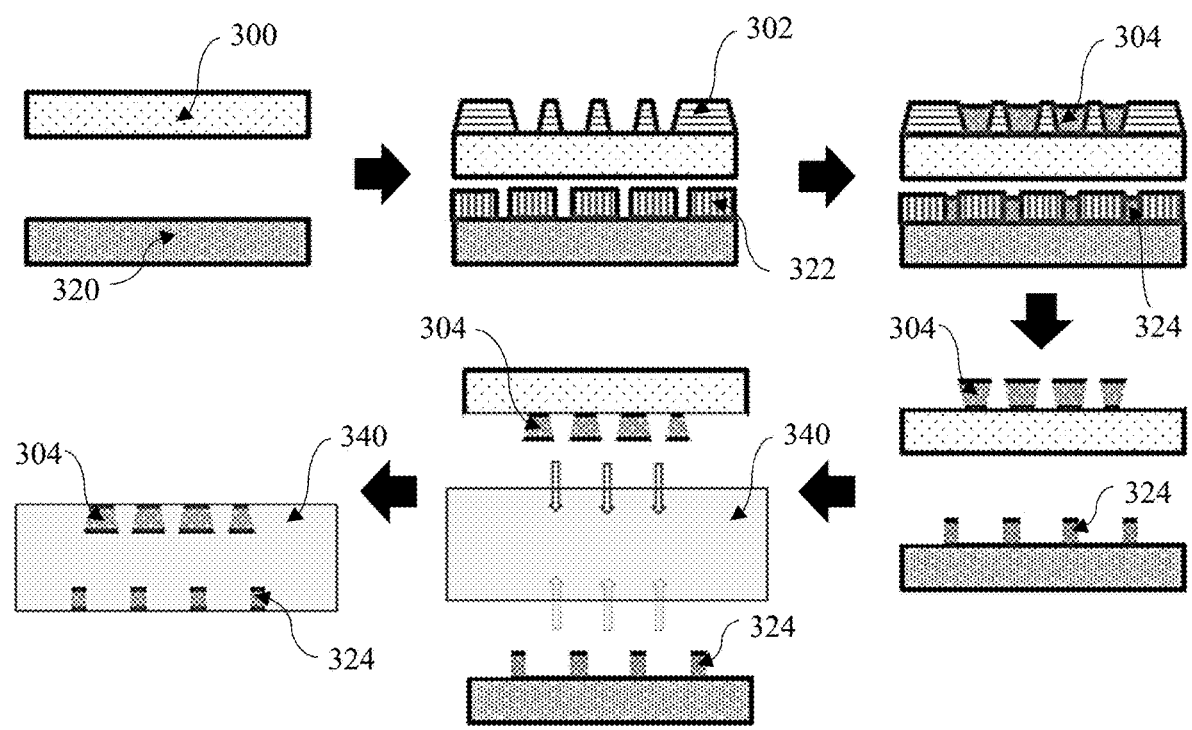
FIG. 3 shows the method of fabricating the capacitive or electrical sensing film according to an embodiment of the present invention.

According to the flowchart shown in FIG. 3, it is provided that the method of producing the capacitive or electrical sensing film comprises the following steps. Firstly, a dielectric or functional substrate 340 is cleaned for preparation. Next, a layer of removable resist layer is prepared over the first carrier substrate 300 where the conductive network patterns are printed on the resist layer by a lithography method (one of photolithography, nanoimprint lithography, e-beam lithography). Followed by the formation of a trench grid network 302 and the conductive substrate being exposed through the trench, the conductive materials are deposited to fill the exposed gaps through the trench and forms the first conductive network 304. The preparation methods may include wet processing approaches, such as electro-chemical process (electroplating, electrodeposition, electroless-deposition), or dry processing approaches, such as sputtering, electronic beam evaporation and thermal evaporation. Electrodeposition is stopped when the first conductive network 304 reaches a preferred thickness and the sample is rinsed to remove the resist layer on the first carrier substrate 300. The aforesaid flow of the formation of a trench grid network 322 is repeated to prepare the second conductive network 324. The first conductive network 304 is sequentially deposited on the first carrier substrate 300 which is placed over the substrate 340 to transfer the first conductive network 304 thereon by pressing the network, where heating on the deformable layer or the conductive network may be required. Finally, the first carrier substrate 300 and the second carrier substrate 320 are removed from substrate 340 and a capacitive or electrical sensing film is formed.

Figure 4:
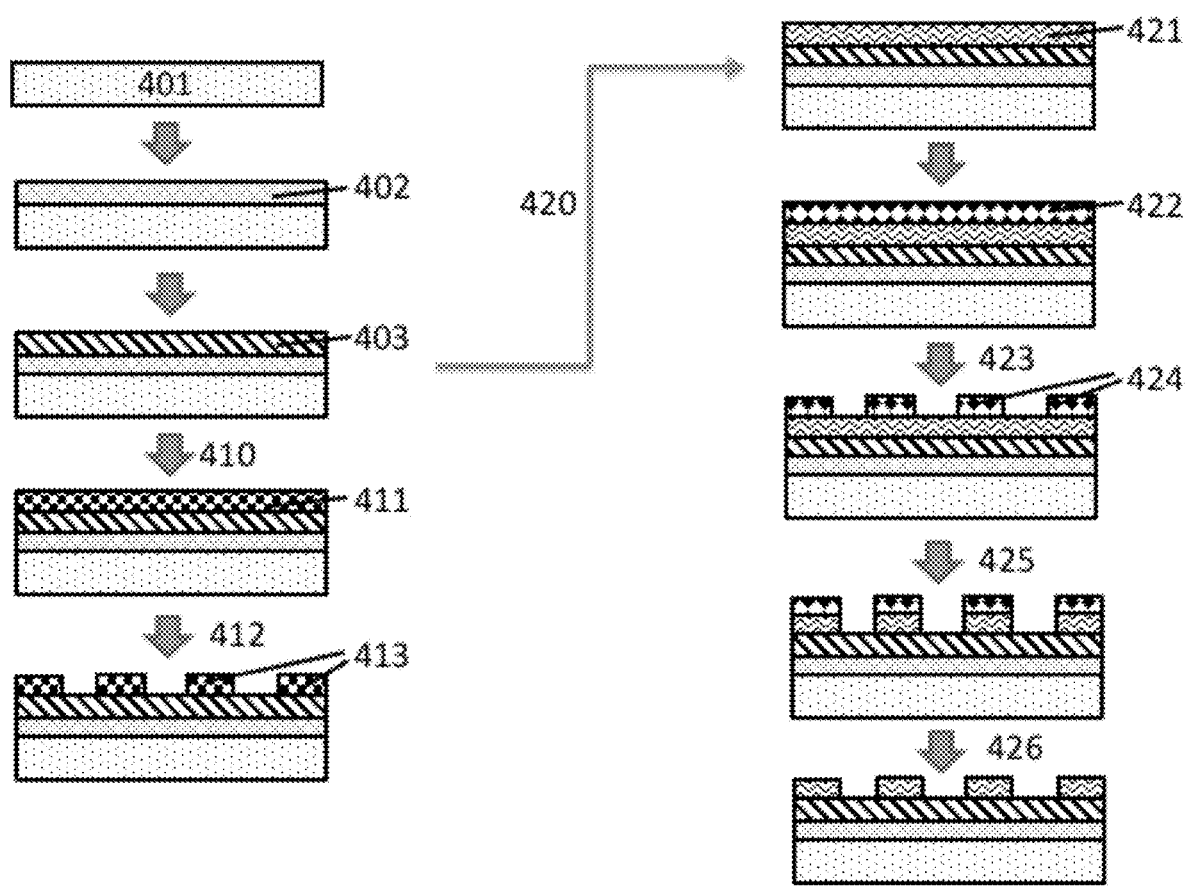
FIG. 4 shows the method of fabricating the present sensing film according to another embodiment of the present invention.

In addition to the method illustrated in FIG. 3, the present sensing film can also be produced by an alternative method based on the flow chart shown in FIG. 4, namely a template approach. The template approach adopts some relatively robust insulating materials such as polyimide or silicon dioxide as a patterning mask, which does not use the traditional removable photoresist as the masking layer. The major advantages of the template approach are to allow a template mask for multiple uses in forming and transferring the conductive network and to enable a high deposition rate of the conductive network when electroplating or electroless plating is used, thus eliminating the complicated lithography process, improving the deposition uniformity in each run, and saving time and money. By using the template mask, very fine patterned conductive networks with line width down to 1 to 2 micrometers can be formed and transferred to many different polymeric substrates without using adhesive material because this approach allows forming an embedded TCF structure using a thermal press to complete the transfer.

In FIG. 4, a first substrate (401) is prepared and cleaned. An example of the first substrate is glass or a polished metal plate. After cleaning, a second conductive layer (402) is optionally formed on the first substrate (401). Formation of the second conductive layer (402) on the first substrate (401) is to increase the overall electrical conductivity such that a high deposition rate of the conductive networks can be achieved by wet processing such as electroplating or some other electrochemical processing because the high electrical conductivity of the above structure would allow high electrical current passing through during the deposition of conductive networks, thus greatly improving the production speed and reducing the manufacturing costs. The second conductive layer (402) can be made of one or more materials including but not limited to gold, silver, copper, aluminium, nickel, chromium, molybdenum, titanium, platinum, any conductive polymer or semi-conductive material, or any combination thereof. The second conductive layer (402) can be deposited by wet processing approaches, such as electrochemical and electroless deposition process(es) and printing process, or dry processing approaches, such as sputtering, chemical vapor deposition, electronic beam evaporation and thermal evaporation. The deposition of the second conductive layer (402) can be tuned such that the growth thereof on the first substrate is anisotropic. When electroplating or electroless plating is used to deposit the second conductive layer (402) on the first substrate (401), additives can be added to prevent the over-deposition of the second conductive layer (402) on the sidewall of a growing first conductive layer (403). In this example, after depositing the second conductive layer (402) on the first substrate (401), the first conductive layer (403) is formed on the second conductive layer (402). The material for forming the first conductive layer (403) includes but not limited to indium tin oxide (ITO) based materials, zinc oxide (ZnO) based materials, tin oxide based materials (SnO) and other conductive metal oxide based materials. It should be understood by a person skilled in the art that the deposition of the second conductive layer illustrated in FIG. 4 is optional and can be omitted.

A layer of insulating material is then formed on the first conductive layer. There are at least two approaches to form the insulating layer. The first approach (410) is to select a photosensitive material, for example, a photosensitive polyimide (PSPI), as the material to form the insulating layer (411). In this way, because the insulating material is photosensitive, the insulative layer (411) also serves as a removable resist layer and thus no etching is required. Patterns (413) can be developed directly after some photo-resists with photomasking (412) are exposed by lithography. The network pattern (413) can also be formed in the insulating layer by alternative methods such as photolithography, nanoimprint lithography, e-beam lithography and additive printing.

The second approach (420) is to select an inorganic material which is non-photosensitive, e.g., $SiO_2$ or SiN as the material to form the insulating layer (421). A layer of photosensitive material (422) is then deposited on the insulating layer (421) as a removable resist. Patterns (424) are developed by exposing photo-resists by lithography with masking (423). Some unmasked area exposes the insulating layer (421) and patterns (424) are developed into the insulating layer (421) followed by etching (425). Etching (425) includes but not limited to wet etching or dry etching. The remaining photo-resists are removed by stripping and sufficient washing (426). Conductive materials are then deposited to form the network until it reaches a sufficient thickness. The as-prepared conductive network lines on the first substrate are then transferred into the deformable layer(s) on the second substrate by hot press, where heating on the deformable layer or the conductive network may be required. The second substrate is then separated from the first substrate with the conductive network pattern already embedded in the second substrate to form the present sensing film.

In one embodiment, the insulating layer has a thickness not more than 5,000 nm.

In another embodiment, the second conductive layer has a thickness from 10 to 1,000 nm.

In also another embodiment, the second conductive layer has a sheet resistance of 5 ohm per square or lower.

In other embodiment, the removal resist after photo-curing has a working temperature more than 80 degree Celsius.

In yet another embodiment, a non-adhesive interfacial layer can be added on the insulating layer to facilitate removal of the substrate during transfer.

By using the method illustrated in FIG. 4, it is possible to transfer the conductive networks from the first substrate to both top and bottom surfaces of the second substrate, respectively, in a single run such that the present sensing film with conductive network embedded into the deformable layer on both top and bottom surfaces can be fabricated, such as the example illustrated in FIG. 2B.

Alternatively, the conductive networks can be formed by other electrochemical processes, vacuum deposition process, printing process or other solution deposition processes, depending on the properties of the material used.

Preferably, said dielectric substrate has a dielectric constant between 1.1 to 10, to provide a desired touch sensitivity setting. Sensitivity can be represented in terms of Signal to Noise Ratio (SNR) while different factories/laboratories have different metric in the calculation of SNR. As a rule of thumb, a higher capacitive change during a touch results in a higher gain and a better SNR. The formula of capacitance is given as follows.

$$C = \frac{\varepsilon_0 \times \varepsilon_r \times A}{T}$$

$\varepsilon_r$: relative dielectric constant of the overlying panel material $\varepsilon_0$: capacitance per meter of air, defined as $8.85 \times 10^{-12}$ F/m T: thickness of the panel in meters A: area of the touched region in $m^2$ Assuming that the thickness of panel and area of the touched region are unchanged in general, it is clear that the relative dielectric constant directly varies the capacitance value. It is also clear that a higher dielectric constant contributes to a higher capacitance thus affecting the sensitivity.

The functional substrate can intrinsically transform the external signal to the electrical signal, such as any change in light, force, pressure, temperature, electricity, magnetic field, etc. With these external triggers, the functional film can produce the electrical signals, which can be collected by the embedded electrodes. The electrical signals generated from different inputs are collected through the electrodes and are separated by using digital signal processing approaches so that various input signals are able to be gathered and identified with the design in the present invention. The functional substrate can be either transparent or non-transparent film. A good candidate for forming the functional substrate of the present invention is PVDF. Other possible substrates with similar properties could also be used.

The dielectric or functional substrate can be any kinds of deformable materials such as commercially available flexible plastic films, however, a light or thermal curable material is desired to withstand possible heat treatment when transferring the conductive networks onto the substrate.

According to another embodiment of present invention, the discrete electrically conductive electrodes in the first conductive network and the second conductive network are elongated and having a line width of 500 nm-10,000 nm, a line thickness of 0.1 microns-10 microns, and the electrodes having a distance of 1 micron-5,000 microns apart from each other. In some circumstances, both conductive networks interconnect with each other.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

EXAMPLES

Example 1—Bending Test

Figure 5:
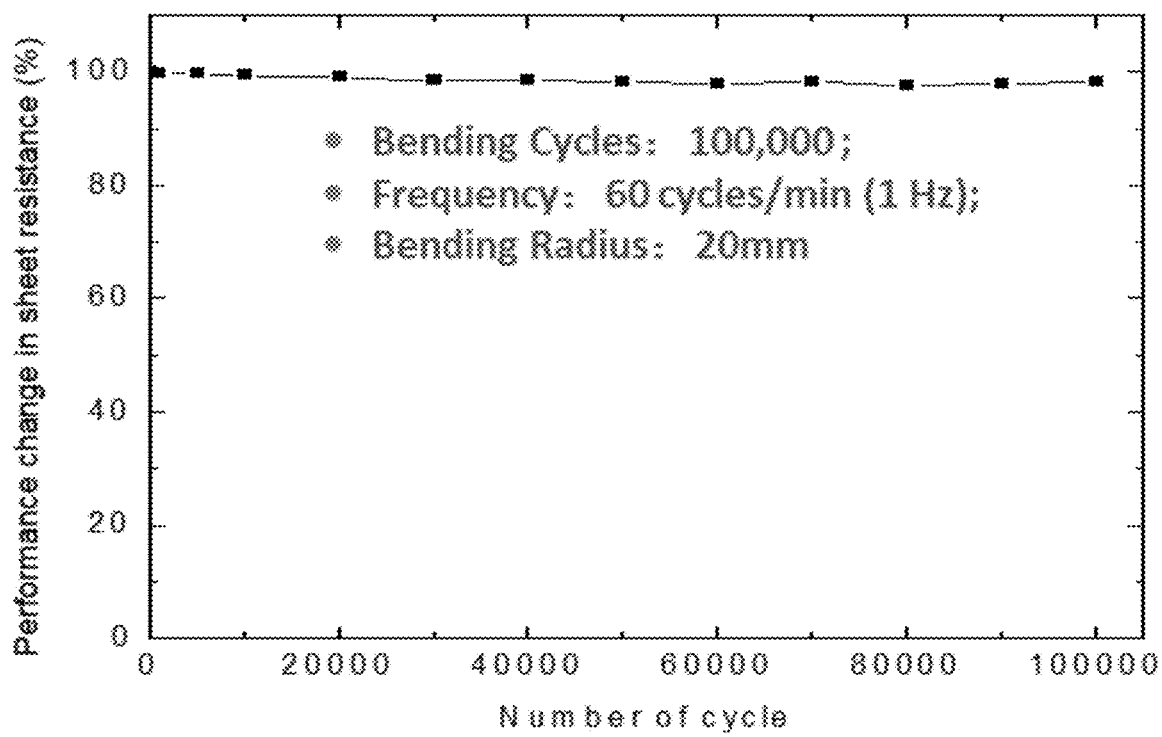
FIG. 5 shows results of bending test on the capacitive or electrical sensing film of different arrangements as in FIGS. 2A and 2B.

FIG. 5 shows the results of a bending test on different configurations of the present sensing film. In this example, COP is used for the dielectric substrate. The test was carried out under the following conditions: bending cycles: 100,000; frequency: 60 cycles/min (1 Hz); bending radius: 20 mm. From the curve shown in FIG. 5, the performance change in terms of sheet resistance (%) over 100,000 cycles at bending radius of 20 mm is minimal. The present film is more flexible while the sheet resistance thereof is substantially unchanged over 100,000 cycles of bending as compared to conventional film, e.g., Sean M. Garner et al., Flexible Glass: Enabling Thin, Lightweight, and Flexible Electronics, 2017. In Garner et al. (2017), it revealed that ITO or other TCO on plastic films would crack during bending after 50 cycles at the bending radius of 20 mm. Other conventional film made of metal nanowires, although it offers a very good flexibility while the sheet resistance is reasonably good after the bending test, has drawback that the sheet resistance is increased significantly when the film is being bended while the sheet resistance thereof is decreased when the film returns to its original state.

Example 2—Damp Heat Test

Figure 6:
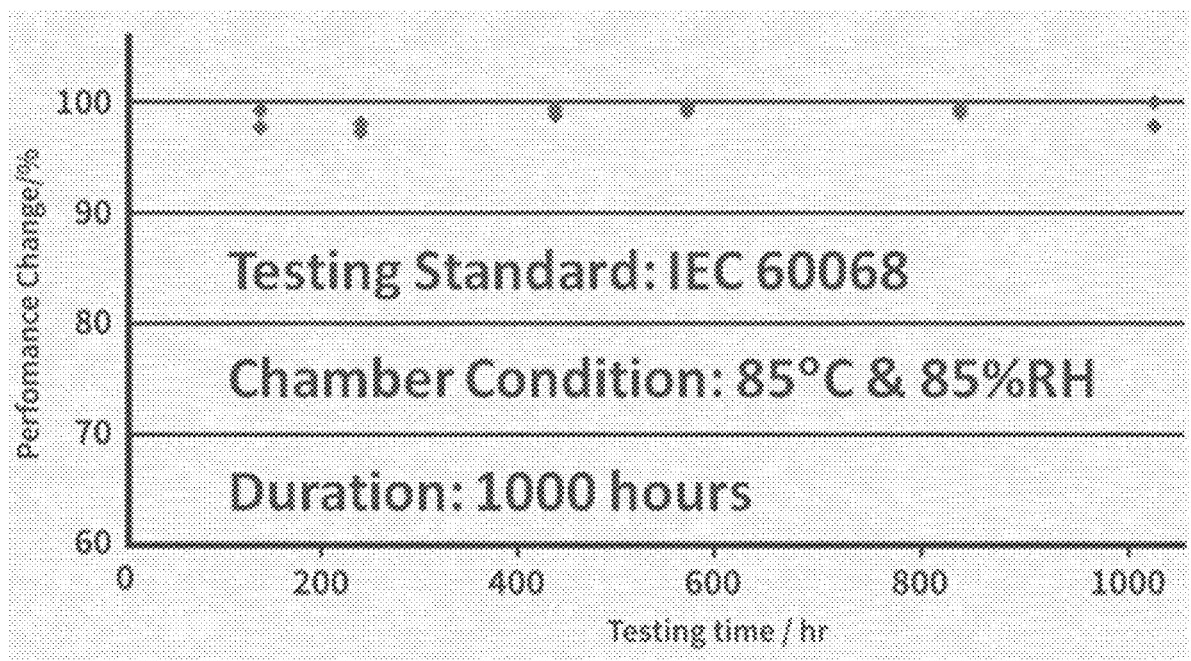
FIG. 6 shows results of damp heat test on the capacitive or electrical sensing film of different arrangements as in FIGS. 2A and 2B.

FIG. 6 shows the results of damp heat test on different configurations of the present film. The test was carried out under the following conditions: testing standard: IEC 60068; chamber condition: 85° C. and 85% humidity; duration: 1,000 hours. From the percentage change in performance in terms of sheet resistance over the testing time of 1,000 hours, there was only less than 5% change in sheet resistance. However, conventional TCO and metal nanowires cannot withstand in such conditions and they either delaminate or corrode. Their electrical resistance would also be increased significantly under such conditions.

Example 3—Thermal Shock Test

The following conditions were used to perform the thermal shock test on different configurations of the present film: temperature setting: +95° C. (high) and −55° C. (low); ramp rate: switching between the high and low temperatures within 10 seconds; soaking time: 1 hour in high and 1 hour in low temperatures for each cycle; number of cycles: total testing duration is 20 cycles (40 hours). Before test, the sheet resistance was 0.587 ohms/sq; after 10 cycles, the sheet resistance became 0.481 ohms/sq; after 20 cycles, the sheet resistance was 0.479 ohms/sq. In terms of the change in sheet resistance, the percentage change is about 18% over 10 cycles and remains more or less the same after 20 cycles of extreme temperature difference. There was no visual defect such as peeling, bubbles, or cracks observed after 20 cycles of the test. The results reveal that the present film can withstand extreme temperature change and is durable.

The invention claimed is:

1. A method of fabricating a capacitive sensing film or an electrical sensing film, comprising:
   a. Preparing and cleaning a first substrate;
   b. Forming a first conductive layer on the first substrate;
   c. Forming an insulating layer on the first conductive layer;
   d. Either the insulating layer also serving as a removable resist layer or forming the removable resist layer on the insulating layer;
   e. Creating a network pattern in the removable resist layer;
   f. Either developing or etching the removable resist layer with the network pattern to form a patterned insulating layer;
   g. Removing the removable resist layer after said etching;
   h. Depositing conductive materials into the patterned insulating layer until a conductive network with line structures reaching a sufficient height to form a conductive network;
   i. Transferring the conductive network with the line structures from the first substrate into one or more deformable layers of a second substrate;
   j. Separating the second substrate from the first substrate after the conductive network pattern is embedded in the second substrate in order to form the capacitive sensing film or electrical sensing film.

2. The method of claim 1, wherein the first substrate is made of glass or a piece of polished metal plate.

3. The method of claim 1, wherein a second conductive layer is formed on the first substrate prior to said forming of the first conductive layer, and said second conductive layer is made of a material different from the material for the first conductive layer in order to improve the overall electrical conductivity.

4. The method of claim 3, wherein said second conductive layer is made of a metal comprising gold, silver, copper, aluminum, nickel, chromium, molybdenum, titanium, platinum, or any conductive polymers or semi-conductive materials.

5. The method of claim 3, wherein said second conductive layer is deposited by wet processing approaches comprising electrochemical and electroless deposition process(es) and printing process, or dry processing approaches comprising sputtering, chemical vapor deposition, electronic beam evaporation and thermal evaporation.

6. The method of claim 5, wherein the deposition process(es) is/are tuneable such that the growth of the second conductive layer is anisotropic, wherein the second conductive network is grown to have a thickness of 10 nm to 1,000 nm, and wherein the deposition process(es) is/are electroplating or electroless plating with additives to prevent the deposition of conductive layer on the sidewall thereof.

7. The method of claim 3, wherein said second conductive layer has a sheet resistance of 5 ohm per square or lower.

8. The method of claim 1, wherein said insulating layer is made of a photosensitive material selected from a photosensitive polyimide.

9. The method of claim 8, wherein said insulating layer also serves as the removable resist layer.

10. The method of claim 9, wherein the network pattern is created in the removable resist layer by lithography.

11. The method of claim 10, wherein said lithography comprises photolithography, nanoimprint lithography, and e-beam lithography.

12. The method of claim 10, wherein the patterned insulating layer is developed after said lithography and the removable resist layer is then removed.

13. The method of claim 8, wherein the removable resist layer after photo-curing has a working temperature of more than 80 degree Celsius.

14. The method of claim 1, wherein said insulating layer is made of an inorganic material which is non-photosensitive selected from silicon dioxide or SiN.

15. The method of claim 14, wherein the removable resist layer is formed on said insulating layer.

16. The method of claim 15, wherein the network pattern is created in the removable resist layer by lithography.

17. The method of claim 16, wherein the insulating layer is further patterned by etching.

18. The method of claim 16, wherein the removable resist layer after said lithography is removed.

19. The method of claim 1, where said insulating layer has a thickness not more than 5,000 nm.

20. The method of claim 1, wherein a non-sticky interfacial layer is added on the insulating layer to facilitate removal of the substrates during said separating.

* * * * *